(12) United States Patent
McKim

(10) Patent No.: US 11,902,111 B1
(45) Date of Patent: Feb. 13, 2024

(54) SERVICE STATUS DETERMINATION FRAMEWORK

(71) Applicant: State Farm Mutual Automobile Insurance Company, Bloomington, IL (US)

(72) Inventor: Grant McKim, Skiatook, OK (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/330,852

(22) Filed: Jun. 7, 2023

(51) Int. Cl.
  *H04L 41/50* (2022.01)
  *H04L 67/51* (2022.01)
  *H04L 41/5009* (2022.01)
  *H04L 67/10* (2022.01)

(52) U.S. Cl.
  CPC ...... *H04L 41/5032* (2013.01); *H04L 41/5012* (2013.01); *H04L 41/5096* (2013.01); *H04L 67/10* (2013.01); *H04L 67/51* (2022.05)

(58) Field of Classification Search
  CPC ............ H04L 41/5032; H04L 41/5012; H04L 41/5096; H04L 67/51; H04L 67/10
  USPC ........................................................ 709/224
  See application file for complete search history.

(56) References Cited

U.S. PATENT DOCUMENTS

| | | | | |
|---|---|---|---|---|
| 11,750,475 | B1* | 9/2023 | Gonzalez | G06F 9/45558 |
| 2016/0299933 | A1* | 10/2016 | Fillipi | G06F 16/2343 |
| 2019/0097909 | A1* | 3/2019 | Puri | G06F 16/951 |
| 2021/0157694 | A1* | 5/2021 | Dye | G06F 11/2041 |
| 2021/0349757 | A1* | 11/2021 | Qiao | G06F 9/4887 |
| 2023/0155900 | A1* | 5/2023 | Fulton | H04L 41/5061 709/221 |

* cited by examiner

*Primary Examiner* — Wing F Chan
*Assistant Examiner* — Leon Y Tseng
(74) *Attorney, Agent, or Firm* — Lee & Hayes, P.C.

(57) ABSTRACT

Described herein are systems and techniques to facilitate rapid and effective notification of issues that may affect services and applications configured at a cloud-based system. A service monitoring system may be queried regularly for status data for services operating in a cloud-based system. The service status data received in response may be compared to previously stored service status data to identify new and changed issues. Based on the types of issues identified, urgent and/or non-urgent notifications may be generated and transmitted to the users associated with the affected service and/or other parameters using multiple communications channels. Responsive failover actions may also be implemented based on the detected issue and the impacted service.

20 Claims, 5 Drawing Sheets

SERVICE STATUS DETERMINATION FRAMEWORK

BACKGROUND

The increase in computer network capacity and quality has led to an exponential growth in the use of remote and decentralized data processing and storage systems, often referred to as "cloud" systems. Many types of organizations and users interact with cloud data processing and storage systems and other types of data processing systems to perform a variety of operations. For example, data processing systems are routinely used for sales transactions, financial transactions, customer service interactions, social media interactions, providing entertainment content, controlling equipment and infrastructure, and storing any data related to such functions.

The use of cloud-based systems allows customers of such systems to provide services and host applications without incurring the expense of purchasing and maintaining physical equipment. However, because the customers do not own or maintain the physical equipment, their access to the equipment and software used to provide their services and application may be limited. For example, many cloud-based services and applications are provided by virtual machines. The customers may have little or no visibility to the underlying platforms and software supporting such virtual machines. In these situations, the customer may be reliant on a passive cloud-services provider monitoring system to notify the customer of outages or other issues that may arise with the platforms supporting the customer's services and applications, which may introduce delay in addressing such issues and restoring disrupted services and applications. The examples of the present disclosure are directed to overcoming these deficiencies and providing a faster and more efficient means of detecting and addressing outages and other issues that may occur in cloud-based systems.

SUMMARY

Techniques described herein implement a service status determination framework within a system that queries a service monitoring system regularly for status data for services operating in a cloud-based system. The service status data received in response may be compared to previously stored service status data to identify new and changed issues. Based on the types of issues identified, urgent and/or periodic notifications may be generated and transmitted to the users associated with the affected services and/or applications, in some examples based on various other parameters and using multiple communications channels. Recipients may be added or changed for particular service and issue combinations by request via an application programming interface. Responsive failover actions may also be implemented based on the detected issue and the impacted service.

For example, the techniques described herein may relate to a method for querying, by a processor, a service monitoring system configured at a cloud-based system for service status data associated with a service executing at the cloud-based system; receiving, at the processor from the service monitoring system, the service status data; determining, by the processor and based at least in part on the service status data, an issue impacting the service; modifying, by the processor and based at least in part on the service status data, a record in a service status data store associated with the service; determining, by the processors and based at least in part on the issue and the service, one or more recipients and one or more communications systems corresponding to individual recipients of the one or more recipients; generating, by the processor and based at least in part on the service status data, a notification instruction comprising at least one of the one or more recipients; and transmitting, by the processor to the one or more communications systems, the notification instruction.

In further examples, the techniques described herein may relate to non-transitory computer-readable medium comprising instructions that, when executed by one or more processors, cause the one or more processors to query a service monitoring system configured at a cloud-based system for service status data associated with a service configured at the cloud-based system; determine an issue impacting the service based at least in part on the service status data; update a record in a service status data store associated with the service based at least in part on the service status data; determine a notification type based at least in part on the updated record; determine a plurality of recipients and a plurality of communications channels based at least in part on the service and the notification type, wherein individual recipients of the plurality of recipients correspond to at least one communications channel of the plurality of communications channels; generate a notification instruction comprising at least one of the plurality of recipients; and transmit the notification instruction one or more of the plurality of communications channels.

In additional examples, the techniques described herein may relate to a system that may include one or more processors and a non-transitory memory storing computer-executable instructions that, when executed, cause the one or more processors to query a service monitoring system configured at a cloud-based system for service status data associated with a service; determine an issue impacting the service based at least in part on the service status data; modify a record in a service status data store associated with the service based at least in part on the service status data; determine a notification type based at least in part on the updated record; determine a plurality of recipients and a plurality of communications channels based at least in part on the service and the notification type, wherein individual recipients of the plurality of recipients correspond to at least one communications channel of the plurality of communications channels; generate a notification instruction comprising at least one of the plurality of recipients; and transmit the notification instruction to one or more of the plurality of communications channels.

Further examples described herein may relate to a system for determining service status data notifications that may include means for querying a service monitoring system configured at a cloud-based system for service status data associated with a service; means for modifying a record in a service status data store associated with the service based at least in part on the service status data; means for determining a notification type based at least in part on the service status data; means for determining a recipient and a communications channel based at least in part on the service and the notification type; means for generating notification content based at least in part on the service status data; means for generating a notification instruction comprising the recipient and the notification content; and means for transmitting the notification instruction to the communications channel.

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Certain implementations and examples of the disclosure will now be described more fully below with reference to the accompanying figures, in which various aspects are shown. However, the various aspects may be implemented in many different forms and should not be construed as limited to the implementations set forth herein. The disclosure encompasses variations of the examples, as described herein. Like numbers refer to like elements throughout.

Figure 1:
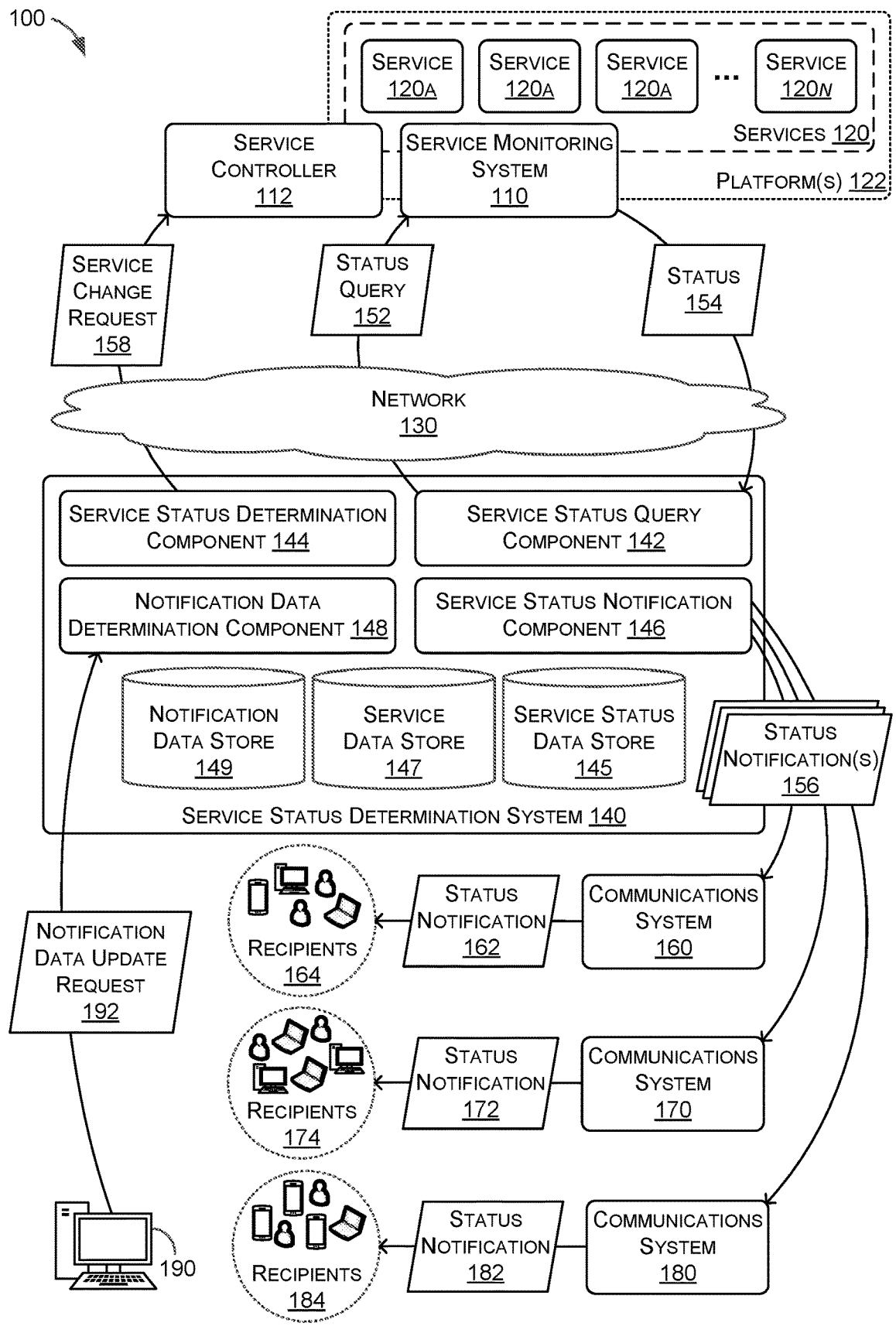
FIG. 1 illustrates an example environment in which cloud-based services may be implemented and in which a service status determination system and the described techniques may be implemented.

FIG. 1 illustrates an environment 100 in which a service status determination framework may be implemented according to examples of the instant disclosure. Services 120 may be one or more services 120a . . . 120n that may be hosted by one or more platforms 122 provided by a cloud service provider or any other provider that provides computing resources (e.g., hardware, software, and/or network resources) for executing and providing access to customer services. As used herein a "service" may be any one or more applications executed on a remote (e.g., with respect to the customer associated with the service) platform. A "platform" as used herein may be any combination of hardware, software, and other computing resources to which a customer may have limited access for the purposes of configuring and executing one or more services. The services 120 may be implemented across any number, type, and combination of computing resources, represented as platform(s) 122. The platform(s) 122 may be distributed across any number of geographical and physical locations and may represent any type and quantity of physical and/or logical (e.g., virtual machines) computing resources that may be used to support the services 120.

The services 120 may be monitored by a service monitoring system 110 that may be provided by the provider of the platforms 122. In examples, the service monitoring system 110 may collect data associated with the services 120. For example, the service monitoring system 110 may be configured to detect or otherwise receive outage data, operational data, performance data, event data, and any other information associated with the services 120. The service monitoring system 110 may be configured to provide or present this data to users via, for example, a user interface (e.g., a graphical user interface). For example, the service monitoring system 110 may present data on a "dashboard" interface with display elements indicating operational and/or configuration data for the individual services 120.

In particular, the service monitoring system 110 may present event data on such a dashboard. As used herein, an "event" may be any adverse condition affecting a service or application and/or the performance thereof, such as a full or partial outage, degraded performance, increased latency, etc. When an event is detected, the service monitoring system 110 may present an indicator on a dashboard that an event has been detected, along with event data (e.g., status, onset, duration, assigned resolution team, etc.). In a conventional system, the knowledge that a customer of a service impacted by an event may have access to is limited to that presented on the dashboard. Moreover, such a customer typically does not have any other means of expediently learning of such an event other than by observing the dashboard.

A service status determination framework may be implemented in a system that interacts with cloud services and/or a cloud service monitoring system, such as services 120 and the service monitoring system 110, respectively, to increase the speed and efficiency of customer notification of service-impacting events. A service status determination system 140 may be configured in the environment 100 as a component of a service status determination framework to perform service status determination and notification operations. The service status determination system 140, and components configured therein, may communicate with the services 120 and/or the service monitoring system 110 (as well as the service controller 112 described in more detail below) via a network 130. The network 130 may any one or more wireless and/or wired networks that may be configured to facilitate communications between computing devices and/or functions.

In various examples, the service status determination system 140, and components configured therein, may also be cloud-based (e.g., executing on one or more compute services provided by a cloud-based system). For example, the service status determination system 140 and its components may be configured at the platforms 122 and/or one or more other platforms provided by the provider of the platforms 122. In such examples, the network 130 may represent any communications means (e.g., any physical and/or logical communications connections) that allow such components to interact with other components in such a cloud-based system, such as the service monitoring system 110, the service controller 112, and the services 120. In examples, the environment 100 may be implemented substantially or entirely within such a cloud-based system.

The service status determination system 140 may include a service status query component 142 that may be configured to obtain service status data from the service monitoring system 110. In examples, the service status query component 142 may be a function executed by a compute service configured in the cloud-based system supporting the platforms 122 and the services 120. This function may be executed by a compute service that has, or is associated with, particular (e.g., dedicated) memory space and/or a particular (e.g., dedicated) operating system that may be implemented on hardware. In other examples, the service status query component 142 may be implemented in any software, hardware, or a combination thereof distinct from the cloud-based system supporting the platforms 122 and the services 120.

The service status query component 142 may be configured to transmit a status query 152 to the service monitoring system 110 requesting current status data associated with the services 120. In examples, the status query 152 may be a request or other instruction for a (e.g., complete) set of current status data for the services 120. Alternatively or additionally, the status query 152 may be a request or other instruction for data that may include or indicate such status data, such as a request for current webpage data that may be used by the service monitoring system 110 to implement and present a dashboard with status data.

The service monitoring system 110 may respond with status 154 that may include current status data for the services 120. The status 154 may include data in any form and format that indicates current status for the services 120 and/or one or more applications that may be configured and/or executed thereon. For example, the status 154 may indicate a current operational status for each of the services 120 and/or one or more associated applications, data associated with any current events impacting any of the services 120 and/or one or more associated applications, current performance data for each of the services 120 and/or one or more associated applications, etc. The service status query component 142 may process the status 154 and/or the data contained therein to generate data to be provided to one or more other components of the service status determination system 140. Alternatively or additionally, the service status query component 142 may be configured to relay or otherwise provide the status 154 to one or more such components (e.g., without modification or substantive processing).

The service status determination system 140 may further include a service status determination component 144 that may be configured to receive the status 154 and/or associated status data from the service status query component 142. In examples, the service status determination component 144 may be a function executed by a compute service configured in the cloud-based system supporting the platforms 122 and the services 120. In other examples, the service status determination component 144 may be implemented in software, hardware, or a combination thereof distinct from the cloud-based system supporting the platforms 122 and the services 120.

The service status determination component 144 may be configured to process status data to determine one or more notifications based on such status data. To perform such operations, the service status determination component 144 may interact with a service status data store 145 configured at the service status determination system 140. The service status data store 145 may be configured with status data associated with the services 120 and/or applications configured thereon. This status data may be based on previous status queries and status data collected by the service status query component 142 and/or determined by the service status determination component 144. In examples, the service status data store 145 may be a database, one or more tables, one or more other data structures, or other data storage means configured in the cloud-based system supporting the platforms 122 and the services 120. In other examples, the service status data store 145 may be implemented in software, hardware, or a combination thereof distinct from the cloud-based system supporting the platforms 122 and the services 120.

The service status determination component 144 may compare the status data received from the service status query component 142 to the status data stores at the service status data store 145 to determine if there has been a change to status data associated with one or more of the services 120 and/or applications configured thereon. For example, the service status determination component 144 may determine if the status data received from the service status query component 142 indicates a new event (e.g., an event impacting one of the services 120 that is not currently represented in the service status data store 145). If so, the service status determination component 144 may generate and store event data for the new event at the service status data store 145.

The service status determination component 144 may also, or instead, determine if the status data received from the service status query component 142 indicates an event update (e.g., data associated with an event impacting one of the services 120 that is different than the data associated with that event that is currently represented in the service status data store 145). If so, the service status determination component 144 may modify the event data to update the event at the service status data store 145.

In examples, the event data that may be obtained, generated, stored, and/or modified in the service status data store 145 may include any data associated with an event and/or one or more impacted services and/or applications. As described herein, some or all of such data may be retrieved and/or obtained from the service monitoring system 110. For example, event data may include an event type, indications of one or more impacted services and/or applications, a geographical or physical location or region, an event onset time, an event duration, an event impact (e.g., number of impacted users, and/or accounts, impacted interface(s), impacted region(s), particular impacted accounts and/or users, etc.), one or more service or application performance metrics, one or more impacted accounts (e.g., customers, organizations, etc.), notes from users addressing the event (e.g., technicians and/or managers working on resolving the event), ticket and/or communications numbers and/or identifiers associated with the event, etc.

For new or updated events, the service status determination component 144 may determine the type of event, e.g., for notification purposes. For example, the service status determination component 144 may determine whether an event is reportable (e.g., should be included in a notification) and/or if the event is urgent or non-urgent. For instance, the service status determination component 144 may be configured to determine that all events that impact a subset of the services 120 (e.g., a set of critical services) are reportable while only outage events and severe latency events that impact the remaining services 120 are reportable. The service status determination component 144 may be further configured to determine new outage events and severe latency events and/or updates indicating resolution of outage events and severe latency events are urgent while other updates and resolutions are non-urgent. The criteria used for making notification determinations may be configured at the service status determination component 144 by one or more (e.g., administrative) users. For events that are reportable, the service status determination component 144 may generate and/or provide event data (e.g., urgent, non-urgent) to one or more components of the service status determination system 140 for notification data determination.

The service status determination system 140 may also, or instead, be configured to take one or more actions in response to determining particular events and/or statuses. For example, the service status determination component 144 may be configured to interact with a service data store 147 that may be configured with actions and/or instructions associated with services 120 and/or applications configured thereon. This service data may be based on configured by one or more (e.g., administrative) users. In examples, the service data store 147 may be a database, one or more tables, one or more other data structures, or other data storage means configured in the cloud-based system supporting the platforms 122 and the services 120. In other examples, the service data store 147 may be implemented in software, hardware, or a combination thereof distinct from the cloud-based system supporting the platforms 122 and the services 120.

The service data store 147 may include data that relates to services and/or applications, event types, and responsive actions. For example, the service data store 147 may include data indicating that for an outage event impacting a particular service, the applications executed on that service should be automatically moved to another service (e.g., terminated on the impacted service and started on a non-impacted service). In another example, the service data store 147 may include data indicating that for a high latency event impacting another service, the applications executed on that service should be automatically moved to another region (e.g., terminated on the impacted service and other services in the same region and started on one or more other services located in another region). The service status determination component 144 may determine that such responsive actions are to be taken using the service data store 147 based on data received from the service status query component 142.

If responsive actions are indicated in the service data stored at the service data store 147, the service status determination component 144 may transmit a service change request 158 to a service controller 112 that may be configured to control and modify the configurations of the various services 120. The service controller 112 may be a cloud-based system customer user interface to the services 120, providing the means for the customer to configure and control the services 120. The service change request 158 may include instructions to implement changes to the service 120 that may be automatically generated by the service status determination component 144 based on event determinations may by that component and data in the service data store 147.

The service status determination system 140 may further include a notification data determination component 148 that may be configured to receive the event data and/or associated data from the service status determination component 144. In examples, the notification data determination component 148 may be a function executed by a compute service configured in the cloud-based system supporting the platforms 122 and the services 120. In other examples, the notification data determination component 148 may be implemented in software, hardware, or a combination thereof distinct from the cloud-based system supporting the platforms 122 and the services 120.

The notification data determination component 148 may determine, based on the received event data and/or associated data, a form and/or timing of one or more status notifications. To perform such operations, the notification data determination component 148 may interact with a notification data store 149 configured at the service status determination system 140. The notification data store 149 may be configured with notification data associated with the services 120 and/or applications configured thereon, as well as corresponding recipient and notification communication channels data. This notification data store 149 data may be based on one or more configurations provided and/or requested by one or more users (e.g., administrative users associated with the services 120 and/or the service status determination system 140). In examples, the notification data store 149 may be a database, one or more tables, one or more other data structures, or other data storage means configured in the cloud-based system supporting the platforms 122 and the services 120. In other examples, the notification data store 149 may be implemented in software, hardware, or a combination thereof distinct from the cloud-based system supporting the platforms 122 and the services 120.

The notification data store 149 may include notification data that relates to services and/or applications, event types, notification types, recipients, and communication channels. For example, the notification data store 149 may include data indicating that urgent events for a particular service are to be included in an urgent notification sent to a first set of particular users or groups using email, a second set of particular users or groups using a chat application, and a third set of particular users or groups using a ticketing system. Each of these sets of particular users or groups may be distinct from the others. In another example, the notification data store 149 may include data indicating that non-urgent events for another service are to be included in a periodic summary notification sent daily to a fourth set of particular users or groups using email and to a fifth set of particular users or groups using text messaging. Here again, each of these sets of particular users or groups may be distinct from the others. The notification data determination component 148 may determine the corresponding notification data for an event and/or associated data using the notification data store 149 and provide such data to one or more components of the service status determination system 140 for notification generation and transmission.

The service status determination system 140 may further include a service status notification component 146 that may be configured to receive the event data and corresponding notification data from the notification data determination component 148. In examples, the service status notification component 146 may be a function executed by a compute service configured in the cloud-based system supporting the platforms 122 and the services 120. In other examples, the service status notification component 146 may be implemented in software, hardware, or a combination thereof distinct from the cloud-based system supporting the platforms 122 and the services 120.

The service status notification component 146 may initiate communications based on the notification data received from the notification data determination component 148 that indicated the event data to be included in such communications. For example, the service status notification component 146 may determine one or more appropriate recipient communications systems for communicating the event data based on such notification data. As shown in FIG. 1, the service status notification component 146 may determine status notification(s) 156 that may represent the event data to be communicated in notifications, as well as one or more recipients and/or any other data that may be used by a commutations system to generate and transmit a communications with an event data notification. The service status notification component 146 may further determine that the status notification(s) 156 are to be transmitted to the communications systems 160, 170, and 180. The list of recipients in a corresponding status notification(s) 156 for each such communications system may differ from the recipients in the status notification(s) 156 for the other communications systems. The service status notification component 146 may transmit the status notification(s) 156 to the communications systems 160, 170, and/or 180 with the corresponding recipients, instructions, and/or other data that may cause such communications systems to generate and transmit responsive communications.

The communications systems 160, 170, and 180 may be any type of communications system and may include any communications means, including any software, hardware, and/or network resources that may be used to generate and transmit communications. For example, any of the communications systems 160, 170, and 180 may be a text messaging system (e.g., in a wireless communications network), an email system, a chat system, a ticketing system, etc. Any of the communications systems 160, 170, and 180 and/or portions thereof may be implemented as one or more functions executed by a compute service configured in the cloud-based system supporting the platforms 122 and the services 120. Any of the communications systems 160, 170, and 180 and/or portions thereof may also, or instead, be implemented in software, hardware, or a combination thereof distinct from the cloud-based system supporting the platforms 122 and the services 120.

The communications systems 160, 170, and 180 may generate and transmit respective communications with status notices based on the received status notification(s) 156. For example, the communications system 160 may receive a status notification 156 from the service status notification component 146 that indicates a set of recipients 164 and status notification data (e.g., event data). The communications system 160 may, in response, generate a status notification 162 indicating the status notification data and transmit the status notification 162 to the recipients 164. In this example, and throughout the instant disclosure, "recipients," such as recipients 164, may refer to one or more individual users, one or more groups of users, one or more email addresses (including email lists), one or more telephone numbers, and/or one or more communications recipients and/or destinations of any type.

Continuing the example of FIG. 1, the communications system 170 may receive a status notification 156 from the service status notification component 146 that indicates a set of recipients 174 and status notification data (e.g., event data). The communications system 170 may, in response, generate a status notification 172 indicating the status notification data and transmit the status notification 172 to the recipients 174. Similarly, the communications system 180 may receive a status notification 156 from the service status notification component 146 that indicates a set of recipients 184 and status notification data (e.g., event data). The communications system 180 may, in response, generate a status notification 182 indicating the status notification data and transmit the status notification 182 to the recipients 184.

Recipients and other notification data may be added, removed, and/or modified as needed by various users. For example, a user may operate a user device 190 (e.g., computer, laptop, smartphone, tablet, etc.) to transmit a notification data update request 192 to the notification data determination component 148. The notification data update request 192 may include a request to add one or more recipients to notifications of one or more types for one or more services and/or applications. For instance, the request 192 may request that a particular user group be added to urgent notifications for a particular service of the services 120. In another example, the request 192 may request that a particular user be removed from periodic (e.g., non-urgent) notifications for a particular service of the services 120. In response to this request, the notification data determination component 148 may (e.g., after performing authentication and/or authorization operations) modify data in the notification data store 149 based on the request.

By proactively collecting and processing event data to determine appropriate notifications and automatically generating and transmitting such notifications, the systems and techniques described herein facilitate the faster and more efficient implementation of failover actions and the speedier resolution of such events. The use of automated event querying and proactive notification of event data using multiple communications channels ensures that the appropriate personnel and systems may be notified of problems with services and applications in a cloud-based system so that such problems can be more quickly mitigated and resolved. Moreover, using the service status determination framework described herein may improve the performance of associated systems and operations. For example, the disclosed systems and techniques provide a faster and more efficient way to retrieve and utilize event data compared to traditional techniques of manually monitoring a dashboard and relying on human operators to determine and take appropriate mitigation and resolution actions.

Figure 2:
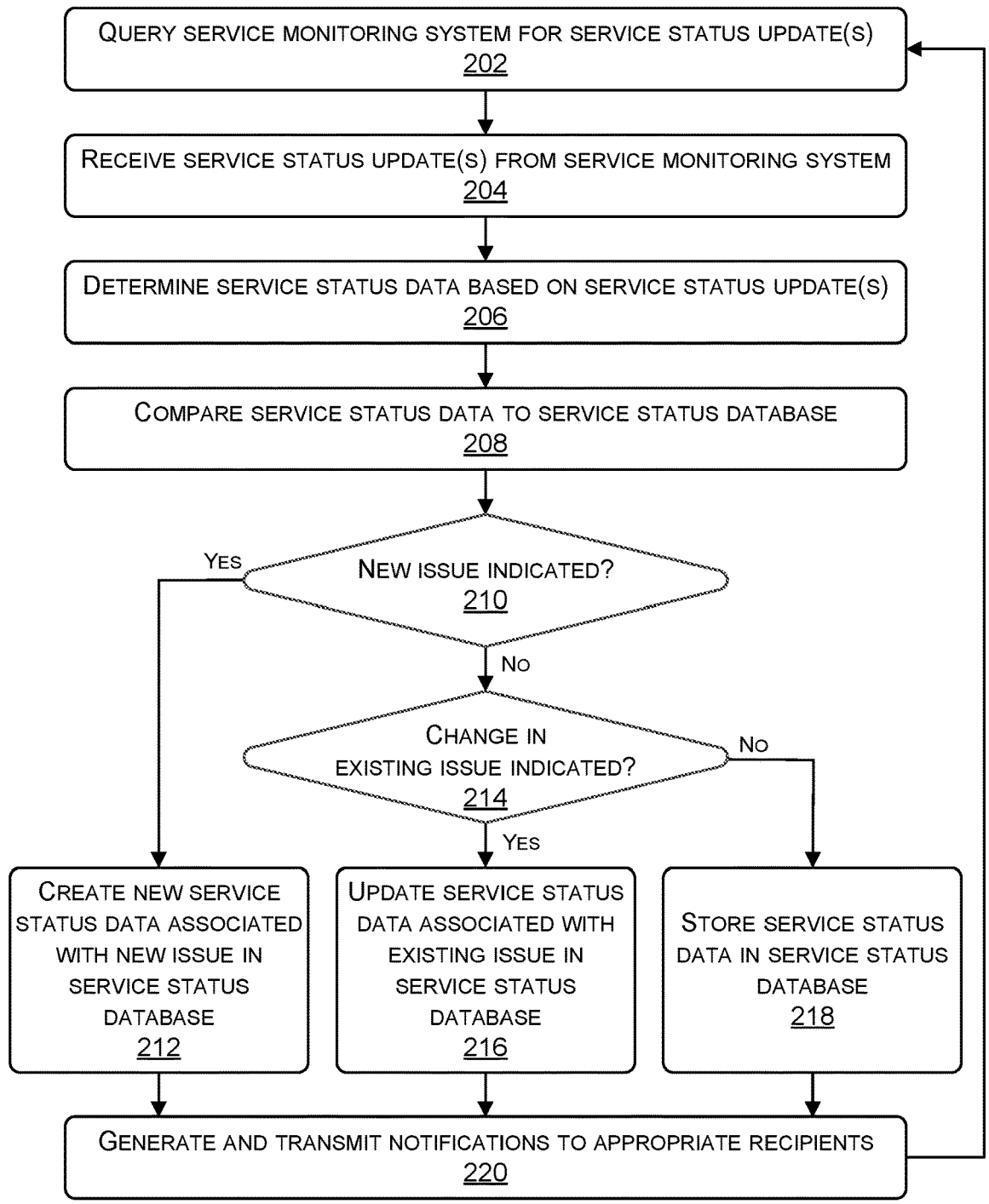
FIG. 2 is a pictorial flow diagram illustrating an example process for collecting and processing service status data and determining whether and how to generate notifications based on such data according to the examples described herein.

FIG. 2 is a pictorial flow diagram of an example process 200 for obtaining and processing service status data and determining notification actions in a system implementing a service status determination framework. In examples, one or more operations of the process 200 may be implemented by a service status determination system, such as by using one or more of the components and systems illustrated in FIG. 1 and described above and/or by using one or more of the components and systems illustrated in FIG. 6 and described below. For example, one or more such components and systems can include those associated with the service status determination system 140 illustrated in FIG. 1. One or more such components and systems can also, or instead, include those associated with the computing device 600 illustrated in FIG. 6. In other examples, one or more operations of the process 200 may be performed by a combination of components described in regard to these systems and/or other systems. However, the process 200 is not limited to being performed by such components and systems, and the components and systems described herein are not limited to performing the operations of the process 200.

At operation 202, a service status determination system (e.g., the service status query component 142) may query a service monitoring system (e.g., the service monitoring system 110) for service status data. The query transmitted may be a request for current status data for a particular one or more services and/or applications, a request for current status data for all services and/or applications associated with one or more particular identifiers (e.g., account numbers, customer number, service cluster, region identifier, etc.). Alternatively or additionally, the query may be a request or other instruction for data that may include or indicate status data, such as a request for current webpage data that may be used by the service monitoring system to display status data. The query may be provided using any appropriate means, including instructions provided to the service monitoring system using an application programming interface (API).

At operation 204, the system may receive one or more service data updates from the service monitoring system. In examples, the responsive service status update may be a single update with data indicating the active events and other status data associated with various services. Alternatively, the service monitoring system may provide individual updates for each service and/or application. Such updates may include current status data for one or more services and/or status data associated with a change of some type (e.g., event occurrence, event termination, event update, etc.).

Based on the received service status update(s), at operation 206 the system may determine service status data for the associated services. For example, the system may determine the particular events and associated event details represented in the service status data and the associated services and/or applications.

At operation 208, the system may compare the service status data determined at operation 206 to service status data stored at a service status database (e.g., the service status data store 145) to determine differences. For example, the system may determine if the service status data determined at operation 206 is associated with a new event, an updated event, a resolved event, etc. by comparing such data to existing data in the service status database or determining that no corresponding data exists in the service status database.

At operation 210, based on the comparison of operation 208, the system may determine whether the service status data determined at operation 206 represents a new issue. For example, the system may determine that the service status data indicates an outage event for a particular service. The system may then determine, at operation 210, that there is no currently listed outage event for that service in the service status database. Therefore, the system may determine that a new issue has been indicated by the service status data. Alternatively, the system may determine that there is an outage event listed for that service in the service status database. Therefore, the system may determine that the service status data does not indicate a new event, at least of the outage event type for this particular service.

Based on determining that a new issue has been indicated, at operation 212 the system may create new service data for the new issue in the service status database. For example, the system may generate a record in the database representing the affected service and/or application and the event impacting the service/application, in examples along with other data (e.g., the event type, time of event onset, time of event detection, event location, affected accounts/customers, notes (e.g., entered by users addressing the event), affected applications, etc.).

If, at operation 210, the system determines that no new issue is indicated by the service status data determined at operation 206, at operation 214, the system may determine if there is a change in an existing issue indicated by the service status data. For example, the system may determine that event data represented in the service status data is associated with an event listed in the service status database, but that one or more parameters or other data associated with the event may be different in the service status data from the corresponding data in the service status database. For instance, an event status may change from "ongoing" to "resolved." Alternatively or additionally, there may be new technician notes in the service status data beyond those currently stored in the service status data. In another example, an anticipated resolution time may be updated. Any change in any parameter or other data that may be indicated in a service status update may be determined at operation 214.

Based on determining that data associated with an existing issue has been indicated, at operation 216 the system may update the service data associated with the issue in the service status database. For example, the system may update one or more records in the database representing the issue, including by updating one or more of an affected service and/or application and the event impacting the service/application, in examples along with other data (e.g., the event type, time of event onset, time of event detection, event location, affected accounts/customers, notes (e.g., entered by users addressing the event), affected applications, etc.).

If, at operation 214, there has been no change to an existing issue (and no new issue indicated as determined at operation 210), at operation 218 the system may store all or a subset of the service status data in the service status database. For example, the system may simply keep a record of when service status data was obtained for future use (e.g., system audit and/or testing to verify proper operation). The system may also, or instead, update duplicate data in the service status database to ensure that the database has the most current data (e.g., the data is timestamped with a time of the most recent receipt of such data).

Figure 3:
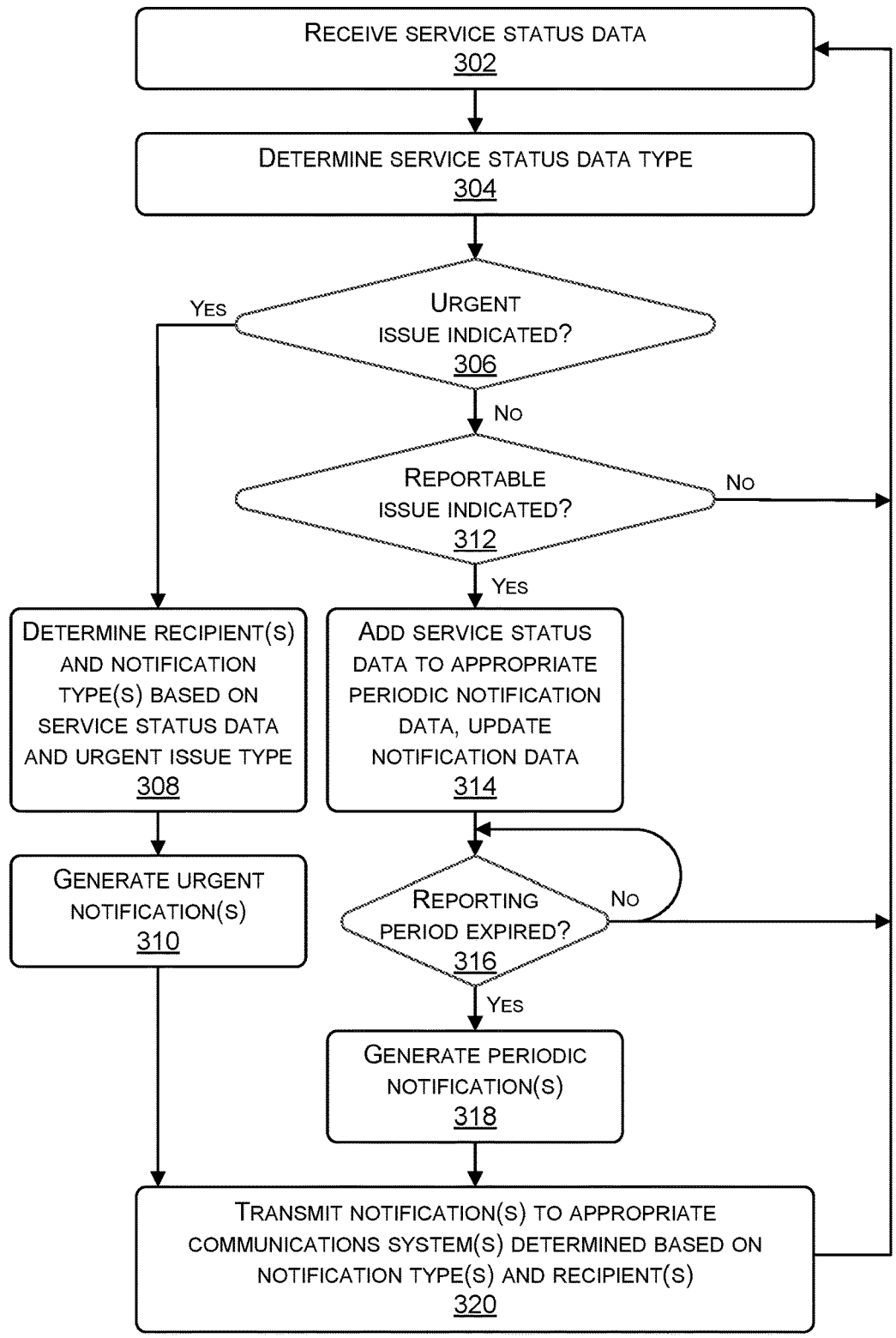
FIG. 3 is a pictorial flow diagram illustrating an example process for determining notification data and generating notifications based on service status data according to the examples described herein.

At operation 220, one or more appropriate notifications may be generated and transmitted based on the service status data operations 212, 216, and/or 218, as described in more detail herein (see, e.g., FIG. 3 and accompanying description).

The process 200 may then return to operation 202 to query the service monitoring system again for additional and/or subsequent service status update(s). In various examples, the system may be configured to perform the operations of the process 200 periodically. For example, the system may be configured to query the service monitoring system every five minutes, ten minutes, hourly, daily, etc. In examples where a query may indicate a time frame for the requested status data, the system may request a status update for further in the past than the most recent prior status update to ensure no data is missed. For example, if the system is configured to query the service monitoring system every five minutes, the system may configure each query to request service status updates for the past six minutes, creating an overlap in the time periods covered by such updates to ensure no status data was missed.

FIG. 3 is a pictorial flow diagram of an example process 300 for determining notification actions and transmitting notifications of various types in a system implementing a service status determination framework. In examples, one or more operations of the process 300 may be implemented by a service status determination system, such as by using one or more of the components and systems illustrated in FIG. 1 and described above and/or by using one or more of the components and systems illustrated in FIG. 6 and described below. For example, one or more such components and systems can include those associated with the service status determination system 140 illustrated in FIG. 1. One or more such components and systems can also, or instead, include those associated with the computing device 600 illustrated in FIG. 6. In other examples, one or more operations of the process 300 may be performed by a combination of components described in regard to these systems and/or other systems. However, the process 300 is not limited to being performed by such components and systems, and the components and systems described herein are not limited to performing the operations of the process 300.

At operation 302, service status data is received, for example at a notification data determination component (e.g., the notification data determination component 148) from a service status determination system (e.g., the service status determination system 140). This service status data may include event data of any type and/or any other service-related data, including as described herein.

At operation 304, the system may determine a service status data type indicated by the service status data received at operation 302. The service status data type may be subsequently used to determine whether and what sort of notification to provide to one or more recipients. For example, as described herein, notifications of particular types (e.g., urgent, non-urgent, new, updates, outage, etc.) may be associated with particular recipients and/or channels of communication.

At operation 306, based on the service status data type determined at operation 304, the system may determine if the service status data is associated with an urgent issue. An "urgent" issue as used herein may be any issue, outage, event, etc. that may be associated with an (e.g., relatively) immediate notification. If an urgent issue is indicated, at operation 308, the system may determine one or more recipients and notification types based on the urgency and, in some examples, other data associated with the service status data. For example, the system may query a notification database (e.g., notification data store 149) that includes data indicating one or more services and/or applications and associated service status data types, communications channels, recipients, and/or other notification conditions and/or data. Using this information, at operation 308, the system may determine one or more recipients and communications channels associated with the impacted service based on the service status data type.

At operation 310, the system may generate one or more urgent notifications using the notification data determined at operation 308 and the service status data. For example, the system may generate the body or content (e.g., the text, audio, and/or video content intended for user consumption) of such notifications. The system may also generate a list of recipients for each communications channel to be used for transmitting the notifications. In various examples, the system may compose the communications that are to include the notifications, while in other examples the system may provide the content of the notification and the recipients to a communications system for composition of the communications containing the notification.

At operation 320, the urgent notification and associated communications and/or recipients may be (e.g., immediately or otherwise without delay) transmitted or otherwise provided to one or more communications systems for transmission to the associated recipients using the respective communications channel associated with each such communications system.

If, at operation 306, based on the service status data type determined at operation 304, the system determines that the service status data is not associated with an urgent issue, at operation 312, the system may determine whether the service status data is associated with a reportable issue. For example, some issues may be passed to a notification data determination component (e.g., notification data determination component 148) that are not actually reportable, but instead may serve other purposes (or no purpose). If the system determines that the issue associated with service status data is not reportable (e.g., via a notification), the system may return to operation 302 to receive subsequent service status data for processing. Other processing may also be performed, other than notification operations. For example, even though the service status data may not be associated with any reportable issues, the system may still store and/or process such data for other purposes.

If, at operation 312, the system determines that the service status data is associated with a reportable issue (that is not urgent, as determined at operation 306), the system may store the service status data for future transmission at operation 314. For example, the system may collect such data over time until such time that a periodic notification is triggered to provide the collected data to one or more recipients. In such examples, at operation 314, the system may add the service status data to previously collected service status data (if any). Also at operation 314, the system may determine the notification data associated with the periodic notification and/or update such notification data that may already exist for previously collected service status data. For example, based on the service status data, the system may determine one or more recipients and notification types based on data associated with the service status data. For example, the system may query a notification database (e.g., notification data store 149) that includes data indicating one or more services and/or applications and associated service status data types, communications channels, recipients, and/or other notification conditions and/or data. Using this information, at operation 314, the system may determine one or more recipients and communications channels associated with the impacted service based on the service status data type. Because the service status data received at operation 314 may differ from the service status data received previously, the system may update the notification data that may have been previously determined based on the notification data determined for the most recently received service status data.

At operation 316, the system may determine if the time period associated with periodic reporting of the data stored at operation 314 has expired. A periodic notification may be associated with any timeframe as well as any other criteria. The system may also support multiple types and frequencies of periodic notifications. For example, the system may be configured to send a periodic notification for a particular set of services or applications hourly while also being configured to send a periodic notification for a different set of services or applications daily. The system may further be configured to send a periodic notification for services and applications impacted by a particular type of event monthly while also being configured to send a periodic notification for services and applications impacted by a different type of event weekly.

If, at operation 316, the reporting time period has not expired, the system may return again to operation 316 to continue to monitor the time period. The system may also (e.g., while monitoring the reporting period) return to operation 302 to receive and process service status data that may potentially trigger one or more notifications.

If, at operation 316, the reporting time period has expired, at operation 318 the system may generate one or more periodic notifications using the notification data determined at operation 314 and the collected periodic service status data. For example, the system may generate the body or content (e.g., the text, audio, and/or video content intended for user consumption) of such notifications. The system may also generate a list of recipients for each communications channel to be used for transmitting the notifications. In various examples, the system may compose the communications that are to include the notifications, while in other examples the system may provide the content of the notification and the recipients to a communications system for composition of the communications containing the notification.

At operation 320, the periodic notification and associated communications and/or recipients may be transmitted or otherwise provided to one or more communications systems for transmission to the associated recipients using the respective communications channel associated with each such communications system.

Figure 4:
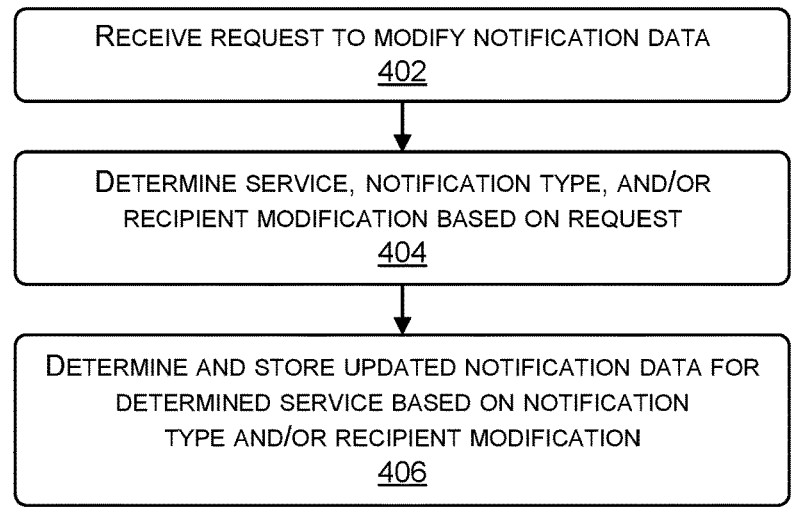
FIG. 4 is a pictorial flow diagram illustrating an example process for modifying recipient data in notification data used to generate notifications based on service status data according to the examples described herein.

FIG. 4 is a pictorial flow diagram of an example process 400 for determining modifying notification recipient data in a system implementing a service status determination framework. In examples, one or more operations of the process 400 may be implemented by a service status determination system, such as by using one or more of the components and systems illustrated in FIG. 1 and described above and/or by using one or more of the components and systems illustrated in FIG. 6 and described below. For example, one or more such components and systems can include those associated with the service status determination system 140 illustrated in FIG. 1. One or more such components and systems can also, or instead, include those associated with the computing device 600 illustrated in FIG. 6. In other examples, one or more operations of the process 400 may be performed by a combination of components described in regard to these systems and/or other systems. However, the process 400 is not limited to being performed by such components and systems, and the components and systems described herein are not limited to performing the operations of the process 400.

At operation 402, a request to modify notification data may be received, for example, at a notification data store (e.g., the notification data store 149), notification data registry, or other application and/or service registry system that may be configured to maintain notification data for one or more services and/or applications. The request may include an indication of a service or application, event and/or notification type, recipient data, communications channel data, and/or any other data that may be stored at a notification data store. In various examples, the request may be received as a communications of any type (e.g., email, chat message, chatbot exchange, webform submission, etc.) that may be processed by the notification data store and/or an associated system (e.g., the notification data determination component 148). In other examples, the request may be one or more instructions that may be received at an API configured at the notification data store and/or an associated system.

At operation 404, the system may determine the indicated service, notification, recipient, and/or any other data that may be included and/or used for a notification data modification based on the request. For example, the system may determine the service referenced in the request to identify the record for the service in the notification data store. The system can then update the recipient for that record based on a recipient modification that may be requested in the request. At operation 406, the system may determine the updated notification data and store such data at the notification data store.

Figure 5:
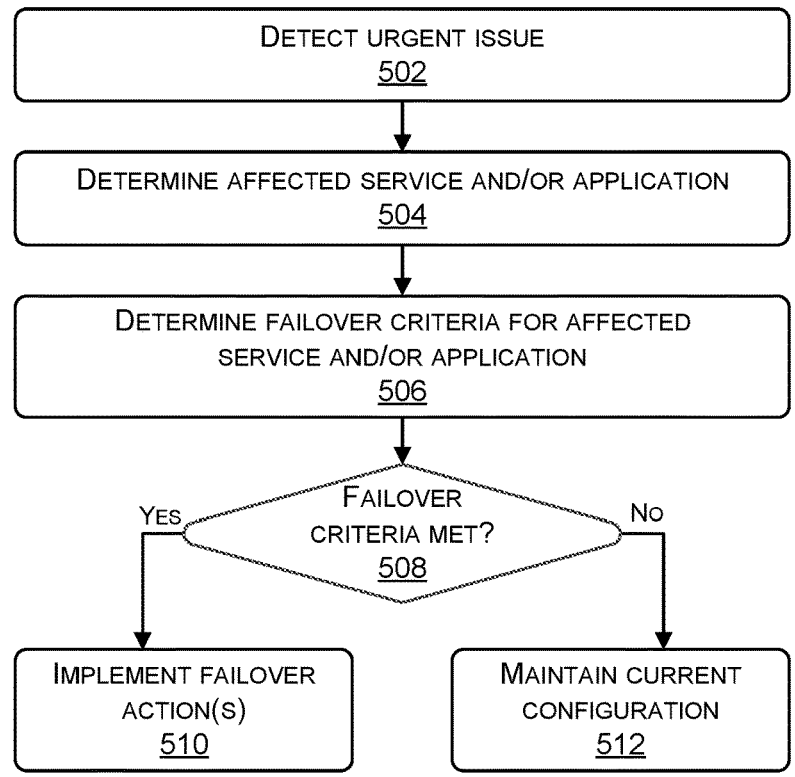
FIG. 5 is a pictorial flow diagram illustrating an example process for determining whether to implement failover actions based on service status data according to the examples described herein.

FIG. 5 is a pictorial flow diagram of an example process 500 for determining and implementing failover actions in a system implementing a service status determination framework. In examples, one or more operations of the process 500 may be implemented by a service status determination system, such as by using one or more of the components and systems illustrated in FIG. 1 and described above and/or by using one or more of the components and systems illustrated in FIG. 6 and described below. For example, one or more such components and systems can include those associated with the service status determination system 140 illustrated in FIG. 1. One or more such components and systems can also, or instead, include those associated with the computing device 600 illustrated in FIG. 6. In other examples, one or more operations of the process 500 may be performed by a combination of components described in regard to these systems and/or other systems. However, the process 500 is not limited to being performed by such components and systems, and the components and systems described herein are not limited to performing the operations of the process 500.

At operation 502, an urgent issue may be detected, as described herein. For example, an outage event may be detected for a particular service based on service status data. At operation 504, the service and/or application associated with the issue may be determined, for example, to determine a corresponding record in a service data store. Such a record in the service data store (e.g., the service data store 147) may indicate that, for this particular service, an outage event is an urgent issue that is associated with one or more responsive actions. Various criteria may be associated with this record, including other criteria that may be required to be satisfied before implementing the responsive actions. For example, an outage event in such a record may be associated with a threshold minimum outage duration required before implementing the associated responsive actions. Similarly, a latency event in such a record may be associated with a threshold minimum latency required before implementing the associated responsive actions. Any other criteria may be included in such records and/or associated with services and/or applications and corresponding responsive actions.

At operation 506, such failover criteria may be determined for the issue (e.g., based on data received at operation 502) and associated service or application. For example, the system may receive an indication of the urgent issue at operation 502 as service status data. This data may include an indication of various parameters that may be associated with the issue. Using these parameters, the system may determine, at operation 506, the criteria for taking responsive actions associated with the issue and corresponding service/application have been met. Continuing the examples above, the system may determine the threshold minimum outage duration or the threshold minimum latency that may be associated with a particular service and corresponding issue type.

At operation 508, the system may determine if such criteria have been met. If the failover criteria have been met, at operation 510, the system may implement one or more failover actions associated with the service or application and the issue. Examples of such failover actions may include moving one or more applications from the affected service to another service (e.g., located in a different region or otherwise not impacted by the issue), triggering one or more recovery actions (e.g., rebooting and restoring service and/or application(s) using backup data), initiating application restart, etc. If, at operation 508, the system determines that the criteria for taking responsive actions have not been met, the system may maintain the current configuration or otherwise proceed with other operations at operation 512.

Figure 6:
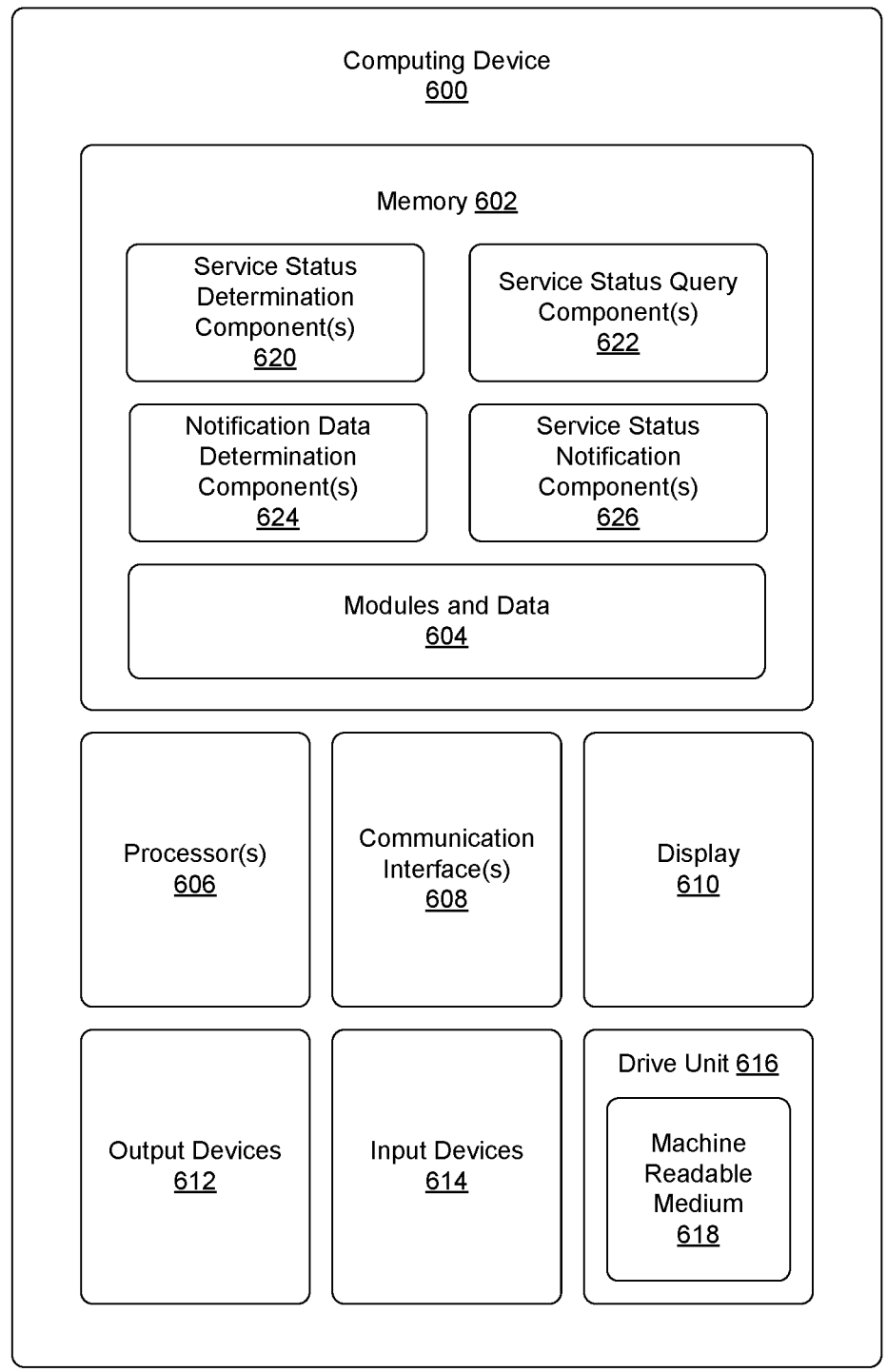
FIG. 6 shows an example system architecture for a computing device that may be used to implement the systems and architectures described herein.

FIG. 6 shows an example system architecture for a computing device 600 that may be implemented as (e.g., part of) any of the systems and devices described herein and/or may perform any of the operations and processes described herein. For example, the computing device 600 may represent any of the systems, devices, and components illustrated in FIG. 1. The computing device 600 may also represent any system configured to implement any of the operations described in regard to FIGS. 2-5 and/or any other operation described herein. The computing device 600 may be a server, computer, mobile device (e.g., smartphone, smartwatch, laptop), or any other type of computing device that may execute any of the operations described herein. In some examples, operations as described herein may be distributed among and/or executed by multiple computing devices 600.

A computing device 600 can include memory 602. In various examples, the memory 602 can include system memory, which may be volatile (such as RAM), nonvolatile (such as ROM, flash memory, etc.), or some combination of the two. The memory 602 may further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media.

Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by one or more computing devices 600. Any such non-transitory computer-readable media may be part of the computing devices 600.

The memory 602 may include modules and data 604 needed to perform operations as described herein by one or more computing devices 600. Included with such modules and data 604 and/or also stored in the memory 602 may be one or more service status determination components 620, service status query components 622, one or more notification data determination components 624, and/or one or more service status notification components 626. The service status determination component(s) 620 may perform any one or more of the operations related to determining, managing, storing, responding to, and/or using any service status data as described herein (e.g., as described for service status determination component 144 illustrated in FIG. 1). The service status query component(s) 622 may perform any one or more of the operations related to determining, obtaining, and/or retrieving any service status data as described herein (e.g., as described for service status query component 142 illustrated in FIG. 1). The notification data determination component(s) 624 may perform any one or more of the operations related to determining, generating, and/or obtaining any notification data as described herein (e.g., as described for notification data determination component 148 illustrated in FIG. 1). The service status notification component(s) 626 may perform any one or more of the operations related to generating, transmitting and/or providing any notification data and/or service status data as described herein (e.g., as described for service status notification component 146 illustrated in FIG. 1).

One or more computing devices 600 may also have processor(s) 606, communication interface(s) 608, display(s) 610, output device(s) 612, input device(s) 614, and/or drive unit(s) 616 that may include one or more machine-readable media 618.

In various examples, the processor(s) 606 can be a central processing unit (CPU), a graphics processing unit (GPU), both a CPU and a GPU, or any other type of processing unit. Each of the one or more processor(s) 606 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 606 may also be responsible for executing computer applications stored in the memory 602, which can be associated with common types of volatile (RAM) and/or nonvolatile (ROM) memory.

The communication interfaces 608 may include transceivers, modems, interfaces, antennas, telephone connections, and/or other components that can transmit and/or receive data over networks, telephone lines, or other connections.

The display(s) 610 can be any one or more of a liquid crystal display or any other type of display commonly used in computing devices. For example, the display(s) 610 may include a touch-sensitive display screen that may also act as an input device or keypad, such as for providing a soft-key keyboard, navigation buttons, and/or any other type of input.

The output device(s) 612 may include any sort of output devices known in the art, such as the display(s) 610, one or more speakers, a vibrating mechanism, and/or a tactile feedback mechanism. Output devices 612 may also include one or more ports for one or more peripheral devices, such as headphones, peripheral speakers, and/or a peripheral display.

The input device(s) 614 may include any sort of input devices known in the art. For example, input device(s) 614 may include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine-readable media 618 of drive unit(s) 616 may store one or more sets of instructions, such as software or firmware, that embodies any one or more of the methodologies or functions described herein. The instructions can also reside, completely or at least partially, within the memory 602, processor(s) 606, and/or communication interface(s) 608 during execution thereof by the one or more computing devices 600. The memory 602 and the processor(s) 606 may also constitute machine-readable media 618.

With the techniques described herein, a scenario involving a vehicle operating in an environment may be more easily and accurately reconstructed, such as for use in documenting an insurance claim and/or addressing legal issues surrounding an incident involving the vehicle. Furthermore, the data used to recreate such a scenario may be more readily and accurately determined, which may, for example, allow the use of such data and/or reconstructions based thereon in related insurance, legal, and financial matters.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   querying, by a processor, a service monitoring system configured at a cloud-based system for service status data associated with a service executing at the cloud-based system;
   receiving, at the processor from the service monitoring system, the service status data;

determining, by the processor and based at least in part on the service status data, an issue impacting the service;
modifying, by the processor and based at least in part on the service status data, a record in a service status data store associated with the service;
determining, by the processors and based at least in part on the issue and the service, one or more recipients and one or more communications systems corresponding to individual recipients of the one or more recipients;
generating, by the processor and based at least in part on the service status data, a notification instruction comprising at least one of the one or more recipients; and
transmitting, by the processor to the one or more communications systems, the notification instruction.

2. The method of claim 1, wherein transmitting the notification instruction comprises:
determining that an issue type of the issue is urgent; and
immediately transmitting the notification instruction.

3. The method of claim 1, wherein transmitting the notification instruction comprises:
determining that an issue type of the issue is non-urgent;
determining that a time period associated with the service status data has expired; and
transmitting the notification instruction based at least in part on determining that the time period associated with the service status data has expired.

4. The method of claim 1, wherein the one or more communications systems comprises:
an email system;
a chat system; and
a ticket system.

5. The method of claim 1, wherein the issue comprises one or more of a service outage or an increased service latency.

6. The method of claim 1, further comprising:
determining, based at least in part on the issue and the service, one or more failover actions; and
implementing the one or more failover actions.

7. The method of claim 6, wherein implementing the one or more failover actions comprises:
determining one or more failover criteria;
determining, based at least in part on the service status data, that the one or more failover criteria have been met; and
implementing the one or more failover actions based at least in part on determining that the one or more failover criteria have been met.

8. The method of claim 1, wherein determining the one or more recipients comprises determining that the one or more recipients are associated with the service in a notification data store.

9. The method of claim 8, further comprising receiving a request at an application programming interface to associate at least one of the one or more recipients with the service in the notification data store.

10. A non-transitory computer-readable medium comprising instructions that, when executed by one or more processors, cause the one or more processors to:
query a service monitoring system configured at a cloud-based system for service status data associated with a service configured at the cloud-based system;
determine an issue impacting the service based at least in part on the service status data;
update a record in a service status data store associated with the service based at least in part on the service status data;
determine a notification type based at least in part on the updated record;
determine a plurality of recipients and a plurality of communications channels based at least in part on the service and the notification type, wherein individual recipients of the plurality of recipients correspond to at least one communications channel of the plurality of communications channels;
generate a notification instruction comprising at least one of the plurality of recipients; and
transmit the notification instruction to one or more of the plurality of communications channels.

11. The non-transitory computer-readable medium of claim 10, wherein the service status data comprises one or more of:
an impacted region;
an issue type;
an issue duration;
an issue onset time; or
one or more user notes.

12. The non-transitory computer-readable medium of claim 10, wherein the plurality of communications channels comprises one or more of:
an email system;
a ticket system; or
a chat system.

13. The non-transitory computer-readable medium of claim 10, wherein the notification instruction further comprises notification content generated by the one or more processors based at least in part on the service status data.

14. The non-transitory computer-readable medium of claim 10, further comprising instructions that, when executed by the one or more processors, cause the one or more processors to:
determine an issue type based at least in part on the issue; and
transmit the notification instruction based at least in part on the issue type.

15. The non-transitory computer-readable medium of claim 14, wherein the plurality of recipients is determined further based at least in part on the issue type.

16. A system comprising:
one or more processors; and
a non-transitory memory storing computer-executable instructions that, when executed, cause the one or more processors to:
query a service monitoring system configured at a cloud-based system for service status data associated with a service;
determine an issue impacting the service based at least in part on the service status data;
modify a record in a service status data store associated with the service based at least in part on the service status data;
determine a notification type based at least in part on the updated record;
determine a plurality of recipients and a plurality of communications channels based at least in part on the service and the notification type, wherein individual recipients of the plurality of recipients correspond to at least one communications channel of the plurality of communications channels;
generate a notification instruction comprising at least one of the plurality of recipients; and
transmit the notification instruction to one or more of the plurality of communications channels.

17. The system of claim 16, wherein the service status data comprises data indicating the issue is resolved.

18. The system of claim 16, wherein the computer-executable instructions further comprise instructions that, when executed, cause the one or more processors to implement one or more failover actions based at least in part on the service and the issue.

19. The system of claim 16, wherein the computer-executable instructions further comprise instructions that, when executed, cause the one or more processors to:
  receive a request at an application programming interface to associate a recipient with the plurality of recipients and with the service in a notification data store; and
  associating the recipient with the plurality of recipients and with the service in the notification data store based at least in part on the request.

20. A system for determining service status data notifications, the system comprising:
  means for querying a service monitoring system configured at a cloud-based system for service status data associated with a service;
  means for modifying a record in a service status data store associated with the service based at least in part on the service status data;
  means for determining a notification type based at least in part on the service status data;
  means for determining a recipient and a communications channel based at least in part on the service and the notification type;
  means for generating notification content based at least in part on the service status data;
  means for generating a notification instruction comprising the recipient and the notification content; and
  means for transmitting the notification instruction to the communications channel.

* * * * *